Oct. 27, 1970     D. S. WALL     3,536,801
METHOD OF STAMPING PIN-DIE SHAPED ARTICLES
FROM PLASTIC MATERIALS
Original Filed Oct. 14, 1964     2 Sheets-Sheet 1

INVENTOR.
Donald S. Wall

BY
ATTORNEY

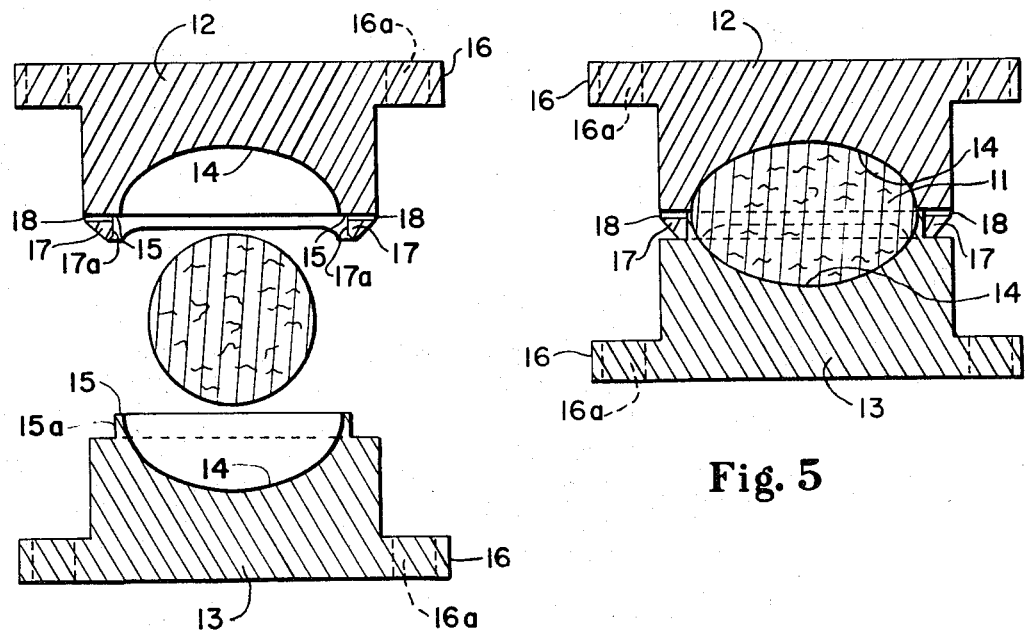
Fig. 4
Fig. 5
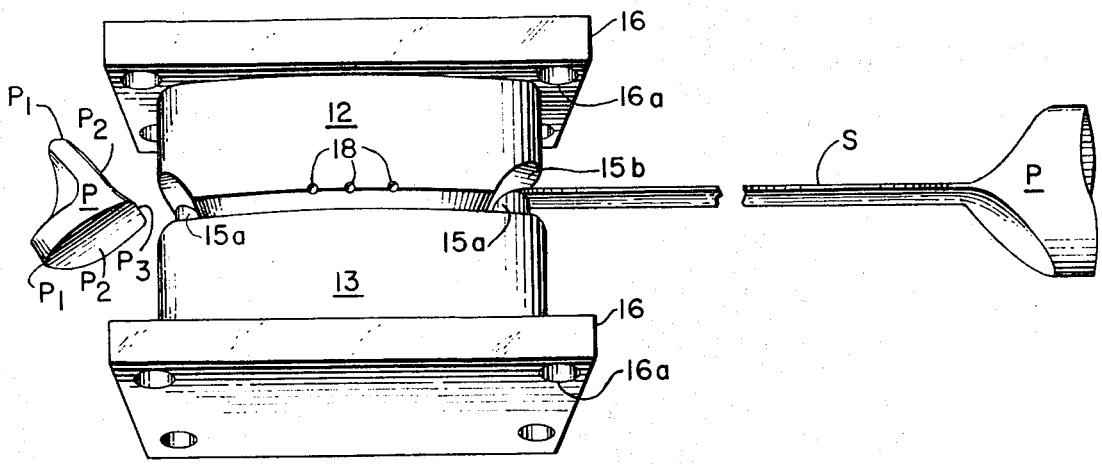
Fig. 6

United States Patent Office 3,536,801
Patented Oct. 27, 1970

3,536,801
METHOD OF STAMPING PIN-DIE SHAPED ARTICLES FROM PLASTIC MATERIALS
Donald S. Wall, Cincinnati, Ohio, assignor to The Procter & Gamble Company, Cincinnati, Ohio, a corporation of Ohio
Original application Oct. 14, 1964, Ser. No. 403,695, now Patent No. 3,365,764, dated Jan. 30, 1968. Divided and this application Oct. 17, 1967, Ser. No. 675,955
Int. Cl. C11d *13/18;* B29c *3/00*
U.S. Cl. 264—161         2 Claims

ABSTRACT OF THE DISCLOSURE

A process of producing on a rotary press a pin-die shaped article from a blank of plastic material, i.e., soap, in which all surplus material is extruded from oppositely disposed ends of a radially oriented die pair. The blank is squeezed within the die pair until the chunk-like primary scrap extrusion is completed. Further extrusion of material from the inboard end of the die pair is then blocked while the flow of substantially all secondary scrap extrusion is directed from the outboard end. Such process prevents build up of hard to handle ribbon scrap near the center of the rotary press turret.

---

This application is a division of the Oct. 14, 1964 application for U.S. Letters Patent Ser. No. 403,695, now U.S. Pat. 3,365,764, by Donald S. Wall, or Skirted Die for Rotary Pin-Die Press.

This invention relates to the formation of plastic materials into articles having a "pin-die" shape and more particularly to a method of stamping "pin-die" shaped bar soaps or detergents on rotary type stamping machines.

Articles, such as bar soaps, have been formed into "pin-die" shapes for many years. As used in the trade, an article having a pin-die shape is one which is adapted to be stamped by means of a die pair having peripheral surfaces or lands adapted to meet in substantial face-to-face contact, in contrast to die stamping by means of a box die, or a pin-box die, wherein the peripheral edges of the opposed surfaces which apply molding pressure to form the article are not brought into contact. In the most familiar embodiments of the latter forms of dies, one die half is telescoped within a passageway in a box portion, which passageway surrounds the other die half and provides the mold surfaces interconnecting the peripheral edges of the die halves. Thus, either the box die, or the pin-box die, stamps an article having ends and side panels with the surfaces thereof formed with a continuous flat band therearound as a result of being molded to the shape of the box passageway between the peripheral edges of the die halves, whereas an article having a "pin-die" shape has no such band.

As normally performed, the process of stamping pin-die shaped bars is one wherein surplus material is extruded in all directions from the peripheray of the bar, necessitating a trimming operation which is either performed manually or with a special automatic trimming mechanism built into or acting in conjunction with the die halves. If done manually, the trimming process is expensive and frequently leaves a rough ridge about the bar along the line at which the surplus material or scrap is separated. Automatic trimming, on the other hand, tends to produce a neater looking trim line but results in the deposit of the scrap surplus material surrounding he machinery and the die halves, compelling a continuous and difficult cleanup and scrap collection operation.

Many formulations of soap and/or detergent (hereinafter referred to jointly as soap), although desirable from a product performance standpoint, do not possess the degree of plasticity or reweldability conductive to good stamping operation. As now practiced, the stamping of such formulations into pin-die shaped bars frequently results in a product having a number of hairline cracks which substantially follow the direction of crystal orientation of the bar which are located in the side or on the face panels thereof. This type of defect is particularly prevalent where a plodder makes identical soap blanks for various shapes of bar soaps or where it is impractical to extrude blanks having a cross section approximating that of the finished bar.

U.S. Pat. 3,159,699, to Richard A. Sutphin, is directed to apparatus and process of stamping pin-die shaped articles from plastic materials. The apparatus of the Sutphin invention comprises a die pair provided with means to prevent extrusion of surplus plastic material in both directions along one axis of the die pair while permitting such extrusion along an axis substantially perpendicular to the said one axis. By this means hand trimming of scrap is obviated, the collection of such scrap is facilitated and the hairline cracks mentioned above are eliminated. The form of die disclosed in the aforesaid patent is well adapted for use in the standard pin-die stamps and may be used to great advantage in association with high speed soap stamps or presses. However, where such high speed presses are of the rotary type, scrap collection and machine cleanup becomes a problem because if the scrap is extruded more or less tangentially of the circular path of travel of the dies in the press, such extrusion will contact and build up on the die pair on each side of that from which the extrusion occurs; if, on the other hand, the extrusion follows substantially radial paths, the portion thereof directed to the inboard side of the machine will build up on the center column and other appurtenances of the rotary press. In either case, such build-up causes frequent cessation of the production run for cleanup purposes in order to permit proper operation of the press. The present invention is a method of obviating such difficulties experienced with the apparatus disclosed in the aforesaid Sutphin patent and has utility in adapting the same for use in connection with rotary type high speed presses.

The rotary type of press is not illustrated herein since its specific form plays no part of the invention; however, it can be briefly described as somewhat similar in construction to rotary capping, filling or cleaning machines in that it is provided with a multiplicity of stations each adapted to perform the same function (in this case stamping an article from an oversize blank) on items sequentially processed during each revolution of the machine. The die-pair stations are vertically aligned and spaced equally around the periphery of a turrent, the portion of the machine which rotates about and is supported by a vertical central column on the machine. Means are provided to cause the die pairs to open and close in timed relationship with the rotation of the machine and with blank feeding and finished bar ejection and removal mechanisms. Thus, the rotary type of machine merely amounts to the incorporation on a rotating turret, or the bar stamping mechanisms from a multiplicity of conventional stamping machines. However, the points of significance here are that (1) the rotary press must of necessity comprise a number of stations since otherwise there is no real advantage to be gained from this construction and (2) the rotary press includes a central portion about which the turret rotates.

As stated above, in adapting the apparatus and method of the aforesaid Sutphin application to rotary presses, scrap collection and machine cleanup becomes problems regardless of how the dies were mounted. Because of the number of stations, non-radial extrusion will tend to accumulate on adjacent die pairs, fouling their operation and reducing machine efficiency and quality. It was ultimately found that substantially radially outwardly directed scrap extrusion could be handled most expeditiously since it would not be deposited on machine parts. But when the dies were mounted in a position whereby the scrap from one end was extruded substantially radially outwardly, that from the other end was directed substantially radially inwardly where the ribbon-like portion of the extrusion tended to build up on the center column of the machine and on any surrounding parts.

It is an object of the present invention to obviate the above difficulties.

It is another object of the present invention to provide a method of utilizing the skirted die of the aforesaid Sutphin patent on rotary stamps or presses in such a way as to preserve all the advantages of the die while making provision to alleviate scrap collection and cleanup problems associated therewith in this particular environment.

Briefly stated, the present invention comprises securing a skirted die pair, which is patterned after the dies of the Sutphin patent, in vertical alignment, placing an oversize blank of plastic material between the mating halves of the skirted die pair, deforming the blank by squeezing the same between the die halves until primary scrap extrusion (meaning extrusion of a chunk-like scrap) is completed on the inboard end of the die pair, blocking the inboard end of the die pair to preclude secondary ribbon scrap extrusion therefrom, and continuing the squeezing operation to completion.

While the specification concludes with claims particularly pointing out and distinctly claiming the subject matter which is regarded as the present invention, it is believed that the invention will be better understood from the following process description and description of a preferred apparatus embodiment for employing the subject process, taken in connection with the accompanying drawings in which:

FIG. 4 is a sectional view of the skirted die of FIG. 1 taken along line 4—4 thereof.

FIG. 5 is a sectional view similar to that of FIG. 4, taken at the time the skirted die is in the full impression position;

FIG. 6 is a perspective view of the skirted die in the full impression position and illustrating the form of the surplus material extruded from each end.

Figure 1:
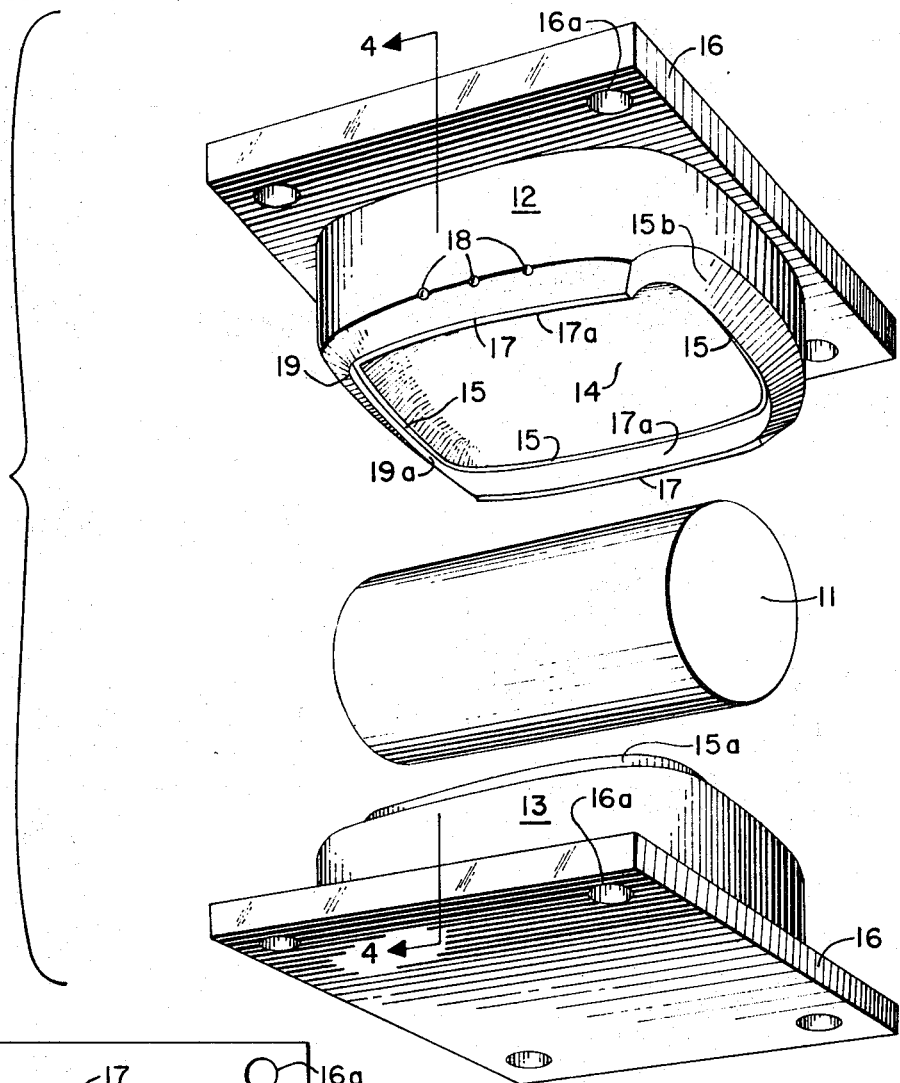
FIG. 1 is a perspective view showing a skirted die of this invention with a soap blank between the die halves.

Referring to FIG. 1, an exemplary soap blank 11 is shown intermediate a pair of mating die halves, upper die half 12 and lower die half 13, in a position to be stamped between the die halves 12 and 13 so as to be molded to the shape of the die cavities 14. The soap blank 11 which is preferably milled soap is taken as a freshly cut piece of continuous extrusion of soap produced by a soap "plodder." At this time the soap blank 11 is in a warm and plastic condition and is best suited for the stamping operation since the blank 11 must be considerably deformed in order to be made to conform to the die cavities 14. As in other stamping operations a stamp die liquor, such as a brine solution, is used as a lubricating and release agent, preferably by application of the liquor to the soap blank 11 before the placement thereof in position for the stamping operation. The specific liquor used and the method of its application, of course, are matters of choice and many variations thereof are well known in the art.

The continuously extruded long bar from the soap "plodder" has a "grain" structure or crystalline arrangement which has been oriented in the direction of the extrusion. Since the soap blank 11 is cut from the long bar, it, too, has a "grain" in the extrusion direction—in this case lengthwise of the blank 11. Although it is possible that blanks 11 could be prepared with the "grain" running oppositely, i.e., transverse the long dimension, such is not usually the case. For this reason, as used herein the terms "length," or "longitudinal," or other words distinguishing one dimension or side from the other planar dimension in terms of greater physical size, should be interpreted as meaning the dimension of the die or blank which parallels the "grain" of the soap. Similarly, the term "width," "across," "lateral," and other like descriptive words are intended to refer to the dimension of the die or blank which is transverse the direction of the "grain."

The soap blank 11 is oversize and must, as in all similar stamping operations, be made to an optimum diameter for economy and best results for the size and shape of the bar being produced. This is a matter of experience once the dies have been prepared and need not be discussed in detail herein. Along this same line, it is usual to cut the soap blank 11 longer than the die length by a finite amount to avoid what is termed a "water mark" in the industry. A "water mark" is the line of separation of two different or distinct shades of the color of the soap in a single bar and is usually found at each end of bars stamped from blanks shorter than the die length.

As shown in the drawings each of the die halves are formed from a single piece of an appropriate die material such a brass, stainless steel, Monel, Inconel or the like. Naturally, the die halves could each be made of two or more separate pieces which are assembled and maintained in a unitary structure without an effect on the function of the die pair. Both upper die half 12 and the lower die half 13 have cavities 14 formed therein which follow the contours of the exterior surface of the portion of the bar intended to be molded thereby. Each also has a flange 16 on the side thereof dorsal of the cavity 14. The flanges 16 are provided with bolt clearance holes 16a or the like to facilitate mounting of the die halves on the press.

Although such is not shown in the figures, various designs or printed matter could be engraved upon, or placed in bas-relief on, the surface of the cavities 14 so as to decorate and/or, identify the source of the bar produced by the die. Such, of course, is a common practice and presently well known to those skilled in the art. Similarly, other features well known in the industry could be incorporated in the die halves to promote production and ease of operation; for example, the use of ejectors to aid in the removal of the finished bar from the dies and the provision of passageways for the circulation of coolant through the die halves. While these features might operate to facilitate the stamping operation, they are not essential to the present invention and therefore not described in detail herein in order to set forth the best mode of carrying out the invention.

Figure 2:
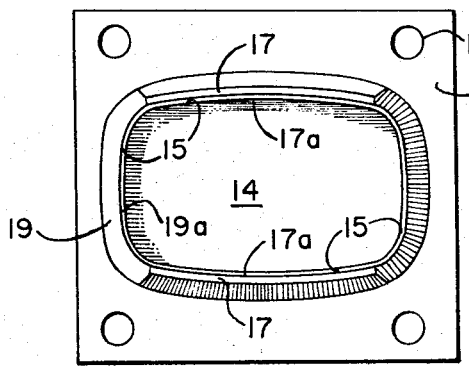
FIG. 2 is a bottom plan view of the upper die half.
Figure 3:
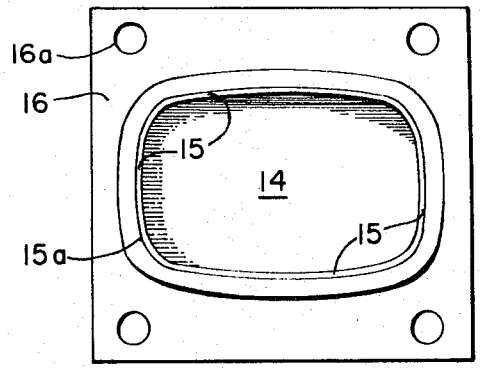
FIG. 3 is a top plan view of the lower die half.

The cavities 14 are each surrounded by a continuous horizontal land 15 of relatively narrow width, the inner edge of which is defined by the peripheral edge of the cavities 14. On the lower die half 13, the outer edge of the land 15 coincides with a vertical surface 15a, shown most clearly on FIGS. 3 and 4, which surrounds and is substantially parallel to the peripheral edge of the cavity 14. On the upper die half 12, as illustrated in FIGS. 1, 2 and 4, the outer edge of the land is defined on one end by an edge of the inclined surface 15b and on the other end and along both sides by the interior vertical faces 19a and 17a of end skirt 19 and side skirts 17, respectively, to be described in more detail hereinafter.

Preferably, for the normal range of bar sizes the width of land 15 should be less than $\frac{1}{16}''$ in order to eliminate the necessity of trimming. When thus dimensioned and upon the application of sufficient pressure during the stamping operation, any surplus soap extruded from the dies will be "pinched-off" between the opposed mating lands 15, and the periphery of the bar will be clear of all such surplus. When stamping bars of milled soap which are of a size normally referred to as "regular" (i.e., having dimensions roughly in the range 2" to 2¼" in width and 3" to 3½" in length) a force of from 8,000 to 10,000 pounds on the die plunger and a hold time of approximately 0.5 second is normally sufficient to obviate the necessity of a scrap trimming operation. In this range of pressures, it has been found that lands 15 which are markedly narrower than about 1/32" wear at a rapid rate and are highly susceptible to damage; however, experience has shown that lands as narrow as from about .015" to .020" can be used commercially, establishing a balance between susceptibility to damage as such lands approach a knife-edge configuration and trimming problems, increased loads and longer hold times as the breadth of such lands increase.

With respect to what has been termed a pinching off of the extruded scrap, it should be noted that in stamping regular size bars, if the die halves 12 and 13 (having lands 15 with a width of about 1/32" to 1/16") are used with a force on the die plunger of about 8,000 pounds, the extrusion between the lands 15 will persist as a thin membranous sheet for approximately 4 seconds before becoming separated from the bar. It has been found, however, that despite this fact, a separation of the extrusion from the bar may be effected after the above-mentioned 0.5 second hold time. The mechanism of this separation is believed to be the fracture of the membranous sheet along the periphery of the bar, caused by stresses developed in the sheet by bar expansive action following the cessation of bar compression. The expansive action (due to internal pressures in the soap causing the bar to expand slightly in thickness when the die pressure is reduced) results in a slight movement of the bar relative to the membrane and the failure of the latter. In any event, it will be seen that to "pinch-off" the scrap extrusion, the opposed lands 15 do not have to be in direct contact. As used herein, terms such as "pinch off" should be interpreted as meaning separation as accomplished by either squeezing all of the extruded scrap from between the lands 15 accompanied by direct contact thereof by the expansive action described above.

One of the die halves, the upper die half 12 of the illustrated embodiment of FIG. 1, is provided with side skirts 17 and an end skirt 19. The inner surfaces 17a and 19a of the skirts 17 and 19, respectively, are of a shape and size to match the corresponding parts of the surface 15a of the other die half, engaging vertical surface 15a in a close sliding fit during the period of final deformation of the blank and full impression position shown in FIGS. 5 and 6. The projection or depth of skirts 17, i.e., the distance by which the side skirts 17 extend beyond the land 15 of the die half 12, may be any dimension sufficient to prevent substantial extrusion in a lateral direction and in some cases has desirably measured at least about three-eights of an inch.

A preferred means of allowing primary scrap extrusion from the inboard end of the skirted die pair and thereafter blocking secondary ribbon extrusion therefrom comprises the aforementioned end skirt 19, incorporated as part of one of the die halves (here illustrated as part of the upper die half 12). The projection on the said end skirt 19 is shown as less than the side skirts 17, though this is not necessarily the case. The end skirt 19 should be shallow enough to permit primary extrusion of scrap from its end of the die pair but deep enough to eliminate the ribbon-like secondary extrusion therefrom. These forms of extrusion are shown on FIG. 6 wherein the primary extrusion is identified as P and the secondary extrusion as S. It will be understood that if primary extrusion only is permitted from the skirt-equipped end, then the surplus material at that end will be restricted to "chunks" of matter such as is illustrated at the left side of the die pair. These are relatively easy to handle because of their weight and the fact that they tend to maintain their integrity.

As indicated above, the projection of the end skirt 19 may be varied within limits so as to control the character of the extrusion from the end of the skirt on which it is situated. This must, however, be restricted to the range of between about 1/16" to about 1/4" because regardless of the blank shape, bar shape, etc., substantial departure from this range will adversely affect die performance. If made too long, the die will not permit proper fill-out of the bar and the sought after primary extrusion from that end of the die pair in the direction of crystalline orientation will be cut off too quickly. If made too short, in effect removing the end skirt 19, then secondary (ribbon-like) extrusion will be permitted from that end of the die pair, creating the problems of cleanup and scrap collection mentioned previously. For general purpose use with a considerable variety of compositions of soap and blank shape, it has been found that a projection of about 1/8" for the end skirt 19 is quite satisfactory.

The lowermost edge of the inner side skirt surface 17a may be rounded or chamfered as shown in FIGS. 4 and 5 to provide a lead-in surface, the purpose of which will be more fully explained hereinafter. One or more exhaust ports or vents 18, which extend through each of the skirts 17 at points aligned with the longitudinal sides of land 15, permit the escape of stamp die liquor and air which may be entrapped during the stamping process. In the absence of such provision for the escape of liquor and air, the entrapped liquor or gas could prevent the soap from completely filling the die cavities in a lateral direction. It has been found that for best operation, the ports 18 should be sized to fall in the range of from .0156" to .020" in diameter.

There are a multitude of ways in which the skirted die for practicing this invention can be attached to a rotary press. For example, the die halves could be bolted to die platens through bolt clearance holes 16a in flanges 16. Since such means are well known in the art and play no part in this invention they have been omitted from the drawing and from the detailed description of this invention in order to simplify the disclosure. In any event, and this is of considerable importance, the dies are mounted on the press in vertical alignment with the side skirts 17a extending in a substantially radial direction and with the end skirt 19 on the inboard end of the die, i.e., the end adjacent to the center column of the machine.

In the die "set-up" and in use, there is no need for the guide pins and guide bushings which are normally a part of the prior art dies for producing pin-die shaped articles. The side skirts 17 and end skirt 19 function to provide both the preliminary alignment and the "running" guide needed during the stamping operation, in addition to the principal functions hereinafter described. The die-set-up is facilitated by mounting the parts of the die upon the stamping machine so that one or both parts are free to be adjusted in location, bringing the die parts together into a full impression position, and then tightening or fastening such parts securely to the machine while they are held in this position.

After the skirted die has been mounted upon the stamping machine, the stamping operation may be described as follows: A soap blank 11 of the proper size and plastic consistency and which has been treated with stamp die liquor is placed or fed between the die halves 12 and 13 when they are in the open position and the die halves are then brought together or into very close proximity under considerable force. As the opposed die halves approach each other, the intervening soap blank 11 is squeezed between the die cavities 14 of the die halves 12 and 13 and thus caused to be compressed in height and expanded in width. Upon continued relative movement as the die halves approach, the side skirts 17 telescope over lower die half 13 and further deformation of the soap blank 11 occurs until finally the deformed blank fills the volume intermediate the die halves at a point in time in the stamping cycle prior to that at which the die halves reach the full impression position. During this initial deformation period, any stamp die liquor and/or air which may be entrapped between the dies are exhausted through ports 18.

Final deformation thereafter occurs until the die halves reach the full impression position, and it is during this phase that the principal function of side skirts 17 comes into play—blocking further expansion of the deformed blank 11 in width and directing all surplus soap in a substantially longitudinal direction so as to be extruded from the die ends. Lateral extrusion is effectively prevented by the close fit of the vertical surface 15a of the lower die half 12 with the surfaces 17a of the side skirts 17 and by the skirt 17 material itself closing egress from between the die halves. Of course, an extremely small amount of soap may enter the ports 18 but such is insignificant in its effect upon the bar quality when ports of the preferred size (i.e., in the .0156" to .020" diameter range) are used. Along this same line it has been noted that during continuous operation of the skirted die, an extrusion of soap into ports of the preferred size does not prevent the escape of air and die liquor therethrough in subsequent stampings since the die is, in effect, self-cleaning in this respect.

While the die halves are approaching each other and the side skirt 17 are functioning as described above, the end of skirt 19 performs its function of limiting the extrusion at the inboard end of the die pair to the "chunk-like" primary extrusion shown in FIG. 6. The end skirt 19 and the portion of land 15 of the die half 13 directly below the end skirt 19 first contact the inboard end of the blank 11 at points $P_1$. Then, as deformation of the blank occurs, extrusion of the inboard scrap in a radially inward direction on the machine and the continued relatively downward movement of the end skirt 19 causes the squeezing and cutting of the extrusion P along the inwardly bowed surfaces $P_2$. Promptly following complete bar fill-in, the lower edge of surface 19a of end skirt 19 becomes juxtaposed with a portion of the top edge of the vertical surface 15a and this causes the inboard primary extrusion to be severed along line $P_3$.

In the meanwhile, the outboard extrusion (shown on the right in FIG. 6) has progressed, slightly lagging behind the inboard extrusion, and shortly after the time the inboard primary extrusion is severed along line $P_3$ the ribbon-like outboard secondary extrusion S commences. The secondary extrusion S continues until the die halves reach the full impression position. Due to the relatively restricted opening between the lands 15 on the outboard end of said die pair and the pressure on the soap being stamped, the secondary extrusion is of a considerably greater length than the primary extrusion and is expelled at a much higher volicity.

Because of its physical characteristis i.e., the greater weight-versus-surface ratio, the "chunks" of surplus material comprising the inboard primary extrusion no not adhere to the machine parts or center column of the machine and are therefore free to drop or otherwise be transferred to the machine base where they can easily be collected in a scrap receiving device. The extrusion from the outboard end of the die pair may be blocked and/or deflected downwardly by a machine guard and thus collected in a tray for later reworking or disposal. Secondary extrusion which sticks to and builds up on the guard may be spraped off or otherwise removed without interfering with the operation of the press.

As the opposed lands 15 are brought contiguous to one another at the conclusion of the final deformation of the blank 11, the pressure exerted upon any soap which lies between the lands causes substantially all of such soap to be extruded outwardly as scrap along with the other surplus soap or to be forced into the bar being formed. In any event, upon reaching the full impression position of the cycle or shortly thereafter, the severing of the scrap from the formed bar is accomplished by the pinching off mechanism previously described, and the extruded scrap at each end is collected in the above-mentioned scrap receiving devices (not shown). Subsequently, the die halves may be moved to an open position and the stamped bar removed by an automatic ejector mechanism so as to prepare the dies for the next stamping operation.

The skirted die and the method of this invention preserve the functions previously ascribed to the side skirts in the aforesaid Sutphin patent (i.e., elimination of hairline cracks, clean separation of scrap from product without auxiliary trimming devices, and concentration of scrap). In addition, the present invention regulates the character of the extrusion from one end of the die pair so as to make it feasible to use this type of die pair, i.e., a die pair adapted to produce pin-die shaped articles, on rotary type stamping presses. Limiting the inboard extrusion, as mentioned above, to the primary portion (thus eliminating secondary extrusion which is radially inwardly directed) is the means by which the successful adaptation of the die pair to the rotary press is accomplished.

Many modifications of the above invention may be used and it is not intended to hereby limit it to the specific process shown or described. The terms used in describing the invention are used in their descriptive sense and not as terms of limitation, it being intended that all equivalents thereof be included within the scope of the appended claims.

What is claimed is:
1. In the process of producing a pin-die shaped article from a plastic material by means of a skirted die pair on a rotary press, the steps which comprise:
  (A) securing the die pair in vertical alignment on said press with the skirts thereof oriented substantially radially of the rotatable portion thereof,
  (B) placing an oversize blank of said plastic material between the mating halves of the skirted die pair,
  (C) deforming said blank by squeezing the same between said die halves until primary scrap extrusion is completed on the inboard end of the said die pair,
  (D) blocking the passage of secondary extrusion from the inboard end of said die pair while directing the flow of substantially all of said secondary scrap extrusion from the outboard end of the die pair, and
  (E) continuing the deformation until said die pair reaches full impression position.
2. The process of claim 1 in which said plastic material is milled and plodded soap.

References Cited

UNITED STATES PATENTS

| 2,915,784 | 12/1959 | Gora | 18—20 |
| 1,836,752 | 12/1931 | Goodwin | 264—325 X |
| 2,072,349 | 3/1937 | Wayne | 264—325 X |
| 2,589,419 | 3/1952 | Moncrieff | 264—325 X |
| 3,159,699 | 12/1964 | Sutphin | 25—7 X |
| 3,341,647 | 9/1967 | Aberle | 264—325 |

ROBERT F. WHITE, Primary Examiner

J. H. SILBAUGH, Assistant Examiner

U.S. Cl. X.R.

264—325